United States Patent [19]

Wis

[11] 4,149,445
[45] Apr. 17, 1979

[54] CORRECTIVE JAW POSITION INDICATOR FOR PROPER PLAYING OF WIND-TYPE MUSICAL INSTRUMENTS

[76] Inventor: Robert C. Wis, 317A Indiana Ct., Bloomingdale, Ill. 60108

[21] Appl. No.: 860,041

[22] Filed: Dec. 13, 1977

[51] Int. Cl.² ............................................. G09B 15/06
[52] U.S. Cl. .................................. 84/468; 84/470 R; 128/2 S; 340/573; 200/DIG. 2
[58] Field of Search ............. 84/453, 465, 468, 470 R, 84/477 R, 387–388, 398–399; 128/2 S, 2.08, 2.1 R; 340/279, 573; 200/DIG. 2, 52 R

[56] References Cited

U.S. PATENT DOCUMENTS 3,670,320  6/1972  Palmer .................................. 340/279

FOREIGN PATENT DOCUMENTS 1124631  4/1959  Fed. Rep. of Germany .......... 128/2.08
232447  11/1968  U.S.S.R. .................................. 128/2 S Primary Examiner—L. T. Hix
Assistant Examiner—S. D. Schneyer
Attorney, Agent, or Firm—Lester N. Arnold

[57] ABSTRACT

A make-break contact assembly useful in the art of musical education comprises switch means and is mounted upon expandible strap means intended to encircle the head of a student to pass adjacent to the chin area and lower jaw and to be responsive to jaw movements to expand or contract the strap means to precipitate the make contact and break contact electrical states of the contact assembly, respectively, selectively indicative of a proper jaw position resulting in proper mouth-playing orientation or an improper jaw position resulting in improper mouth-playing orientation, and visual signalling differentiating between proper and improper jaw positions.

1 Claim, 7 Drawing Figures

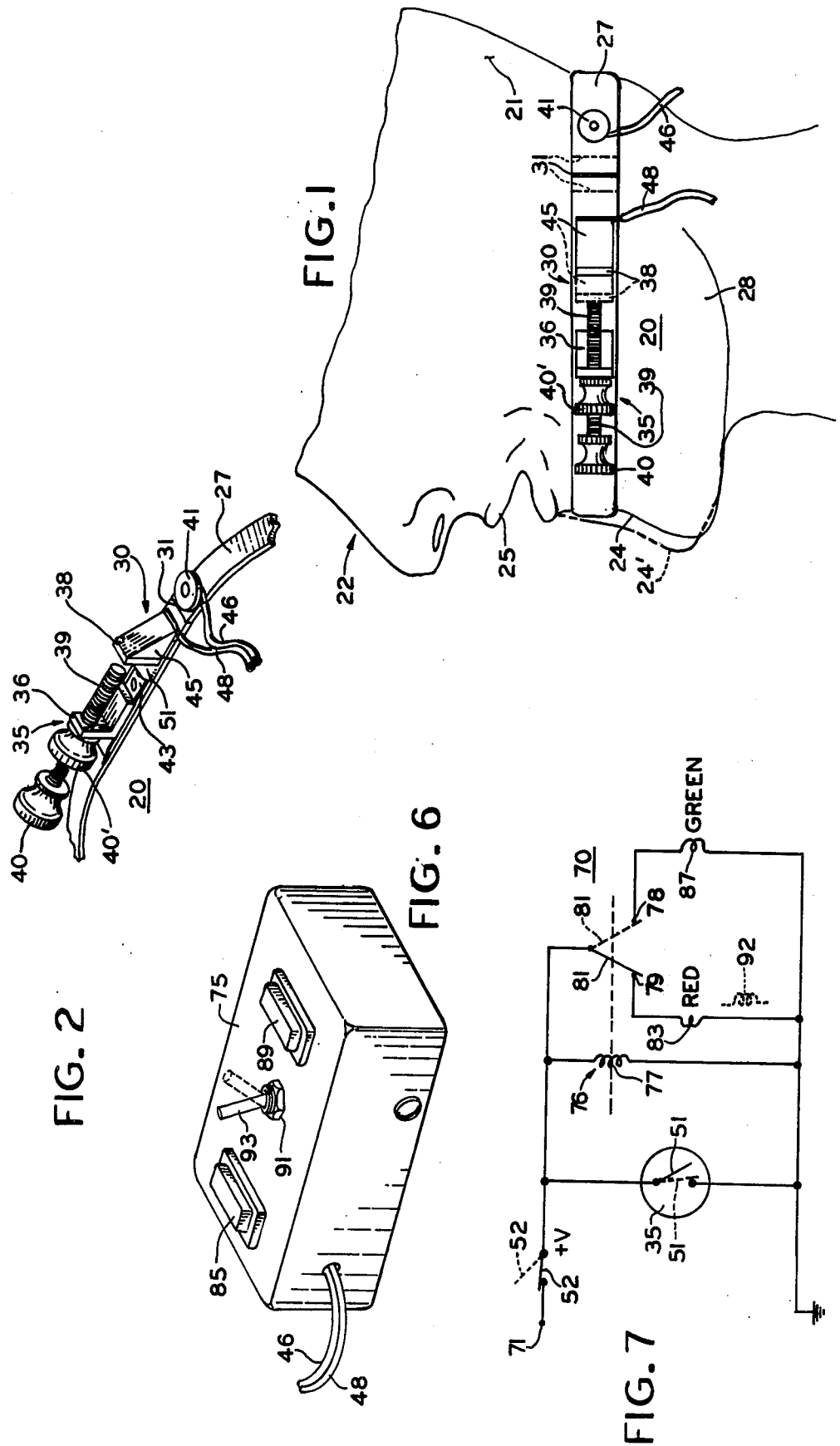

CORRECTIVE JAW POSITION INDICATOR FOR PROPER PLAYING OF WIND-TYPE MUSICAL INSTRUMENTS

FIELD OF THE INVENTION

This invention relates to music education and more particularly to a corrective jaw position indicator for instructing proper playing mouth-position with respect to reed-type wind musical instruments.

BACKGROUND OF THE INVENTION

It is in general agreement in the art of musical education that correct mouth-positioning of a student upon the mouth-piece of a reed-type wind musical instrument such as the clarinet is very critical, especially for the novice student. A very small jaw movement of the student results in the repositioning of the lower jaw; often an incorrect jaw position precipitates an incorrect mouth-position upon the reed-type mouth piece, adversely affecting the student's playing capability. The student to instrument play learning relationship is considerably eased and teaching time is importantly reduced by the use of the present invention comprising a corrective jaw position indicator.

Oral instructional efforts customarily undertaken to influence the student to continue the proper mouth-position and lower jaw orientation are less effective than desired, and are limited to practice sessions with the instructor providing the time to individually instruct each student.

Deficiencies in the tonal production alone are not enough to warn the student that mouth-position to mouth-piece relationship is the probable cause for the playing difficulty. It has been found through multiple teaching experiences that the student has a natural tendency while learning to play a reed-type wind instrument to position his lower jaw rearwardly, and thus, to misalign the lower and upper teeth so as to define an exaggerated overbite in order to adjust for the bulk of the mouth-piece. Most often even a so-called natural or normal bite relationship results in an inset (overbite) lower teeth alignment with reference to the upper teeth. Accordingly, it is even more difficult for a novice student to remember to correctly compensate for the bulky mouth-piece while learning to cope with other playing variables.

The proper mouth-position of the student upon the mouth-piece of the reed-type instrument requires the lower jaw to be more forwardly aligned or protruded to result in the lower teeth of the student being brought into general alignment with reference to the upper teeth. Thus, the attainment and maintenance of the correct playing mouth-position often results in a so-called unnatural, forced or asserted lower jaw position. The added concentration of playing the instrument with many unfamiliar variables to be controlled at once characteristically results in the beginner student's unconscious shifting of the lower jaw in return to the so-called normal or relaxed jaw position. Hence, the student may not at once be aware or conscious of the departure of the lower jaw from the correct playing mouth-position.

It has been found that the presently disclosed corrective jaw position indicator serves to quickly teach and implement the beginner student's knowledge and awareness of the correct playing mouth-position and jaw orientation, significantly reducing the instructional time required to impart to the student a proper mouth-orientation upon the mouth-piece of reed-type musical instruments. The present indicator is also advantageously used in remedial student instruction. The present jaw position indicator includes a battery-powered alarm unit and normally closed relay means effective to signal correct jaw position upon make contact of normally open contact assembly switch means. The contact assembly switch means is a closeable make contact switch which is caused to break the make or closed point contact thereof upon the contraction of the expandable base strap supporting the contact assembly, which contraction may be caused by the student's unconscious relaxation of the lower jaw. The purposeful protrusion of the lower jaw to obtain corrected teeth alignment and mouth position brings the single point contact to the closed position. Hence, the contact assembly switch means is biased to make contact upon forward protrusion of the lower jaw and to break point contact upon contraction of the lower jaw as may be caused by the student's relaxation of the lower jaw to its more so-called natural alignment, or when the student should incorrectly overbite the mouth-piece. Signalling is selectively provided by differential visual alarms and an optional audible alarm could be provided, as more fully disclosed hereinafter.

SUMMARY OF THE INVENTION

A corrective jaw position indicator is comprised of circumferentially expandable base strap means being effective for extension and engagement about the circumference of a student's head in generally horizontal alignment with the chin area of the student, electrical contact assembly switch means having first and second electrical terminal means, contactor blade means interconnected for electrical continuity with the first terminal means, adjustable stationary contact means mounted on the contactor blade means, and moveable slide contact means, the adjustable contact means being in electrical make contact with the moveable slide contact means with the base strap means in a first expanded circumferential state, and the adjustable contact means being broken from electrical contact with the moveable contact means with the base strap means in a second contracted circumferential state, and alarm means including at least first light means indicative of the second circumferential state of the base strap means.

It is an object of the present invention to provide a teaching instructional indicator means to dramatically illustrate the proper jaw position for attaining correct mouth-piece orientation for players of reed-type musical instruments. It is another object of this invention to provide for continuous differential signalling to the player when proper jaw position is being maintained, and when proper jaw position has been lost through undesirable jaw movement.

It is further object of this invention to provide expandible base strap means upon which to mount make-break contact assembly switch means to be worn strapped about the circumference of the player's head with the base strap means generally horizontally aligned to pass across the player's chin area.

It is yet another object to provide adjustable stationary contact means and moveable slide contact means to generally comprise the make-break contact assembly thereof, the slide contact means being moveable to make contact with the adjustable stationary contact means upon expansion of the base strap means.

It is still another object to provide adjustments of the stationary contact means for resetting the break gap of the make-break contact assembly in compensation for varying head-size circumferences of players and for varying degrees of sensitivity in jaw positional movements.

A still further object is to provide first visual alarm means for signalling indication of the make electrical state of the contact assembly switch means, and a second visual alarm means for signalling indication of the break electrical state of the contact assembly switch means.

BRIEF DESCRIPTION OF THE DRAWING

FIG. 1 depicts a player wearing the present invention and with the movement of the player's lower jaw to a forwardly protruding position, the expansion of the base strap means and make contact of the contact assembly switch means shown exaggerated by dash lines.

FIG. 2 is a generally frontal perspective view of the make-break contact assembly switch means mounted on the expandible base strap.

FIG. 6 is a perspective view of alarm housing means including visual alarm indicator means and visual indicator activation switch means.

FIG. 7 is a simplified electrical schematic diagram of the present invention.

DETAILED DESCRIPTION

Figure 3:
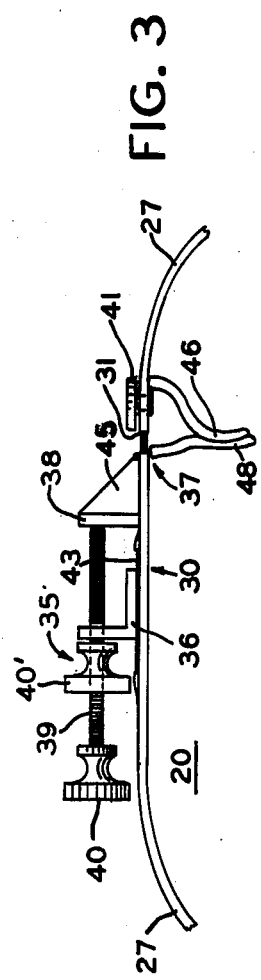
FIG. 3 is a side view of the make-break contact state assembly switch means as shown in FIG. 4.

Referring generally to the accompanying drawings, and specifically to the various FIGS. thereof while disclosing and illustrating the principal parts of the preferred embodiment for the present invention comprising a corrective jaw position indicator 20, there is shown in FIG. 1, the corrective jaw position indicator 20 strapped in a suggested manner about the circumference of the head 21 of a student 22 in a preferred horizontal orientation so as to pass generally across the chin area 24 of the student 22 and disposed free of interference with the mouth 25 of the student 22 to prevent impeding the playing of the mouth-piece of wind musical instruments (not shown) such as reed-type musical instruments.

FIG. 1 shows a side profile view of the primary portion of the head 21 of the student 22 wherein circumferentially expandible base strap means 27 is shown to have electrical contact assembly switch means 30 mounted thereon so as to be generally disposed along the side of the student's jaw 28 and responsive to movements thereof. In accordance with the principals of the present invention, the base strap or substrate 27 is generally cut or severed so as to be separable at 31, and is then joined together at 31 by expandible, flexible strap or substrate means, such as through the employment of an elastic-type strap 33 shown most clearly in FIG. 5. The provision of the elastic strap 33 permits the base strap 27 to expand at a controlled point of expansion, and is desirable to provide proper degree of contact movement and action for the contact assembly switch means 30. There is no requirement for the base strap 27 to be entirely constructed of flexible or elastic materials, and materials of strength and durability, such as vinyls or leathers, can then be advantageously employed to comprise the base strap 27.

FIGS. 2–5 clearly show the corrective jaw position indicator 20 wherein the electrical contact assembly switch means 30 is comprised of moveable contact assembly means 35 including an adjustable stationary contact member 36 and a moveable slide contact member 38, and electrical terminal means 37 including first terminal means in the form of a conductive rivet 41 and a conductive strip-like contactor tine or blade 43 connected to be in electrical continuity with the rivet 41, and second terminal block means 45 connected to and moveable with the slide contact member 38. A pair of electrical conductive lead wires 46 and 48 are functionally interconnected to the contact assembly means 35 through electrical interconnection with the terminal means 37, as by connecting lead wire 46 to the rivet 41 and the lead wire 48 to the terminal block 45. The adjustable stationary contact member 36 is mounted upon and is in electrical contact continuity with the contactor blade 43.

Figure 5:
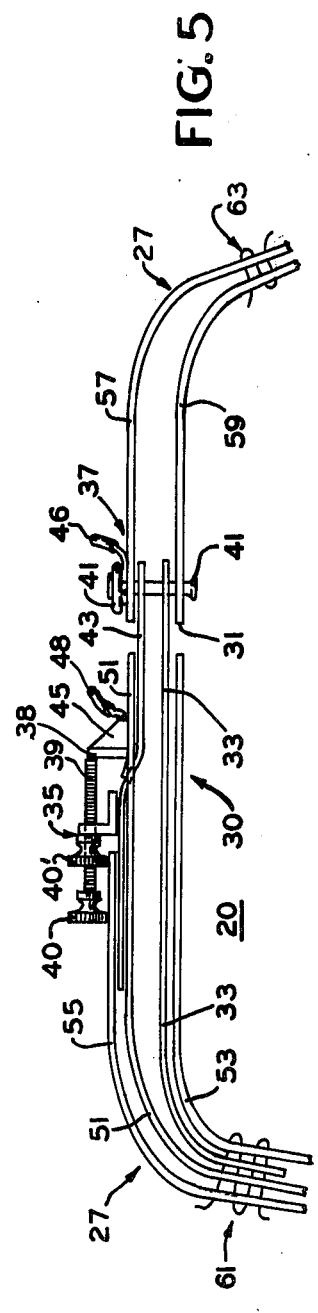
FIG. 5 is an exploded side view of the contact assembly switch means illustrative of the particular configuration and preferred construction thereof, the expandible movement thereof and the threaded contact adjustment thereof.

The structurally combined slide contact 38 and the terminal block 45 move as a unit and both are mounted as a unit upon an upper or top surface layer 51 of the layered base strap 27. In a preferred embodiment of the base strap 27, the base strap 27 can be configured from an upper or top layer of material and a lower or bottom layer of material at least along the portions thereof upon which to mount the contact assembly switch means 30. In an illustration of this preferred configuration, the base strap 27 is provided the top material layer 51 and a bottom material layer 53 on the left-hand portion of the base strap 27 as viewed most clearly in FIG. 5, and a top material layer 57 and a bottom material layer 59 on the right-hand portion of the base strap 27. Additionally, the left-hand portion of the base strap as shown in FIG. 5, includes a shortened overlay 55 of base strap material to define a pocket or opening between the overlay 55 and the top material layer 51 into which the free end portion of the contactor blade 43 can be conveniently inserted and insulated. The layered materials of the base strap 27 can be suitably affixed together as by being sewn as indicated at 61 and 63 in FIG. 5 for the left-hand strap portion and the right-hand strap portion, respectively.

Figure 4:
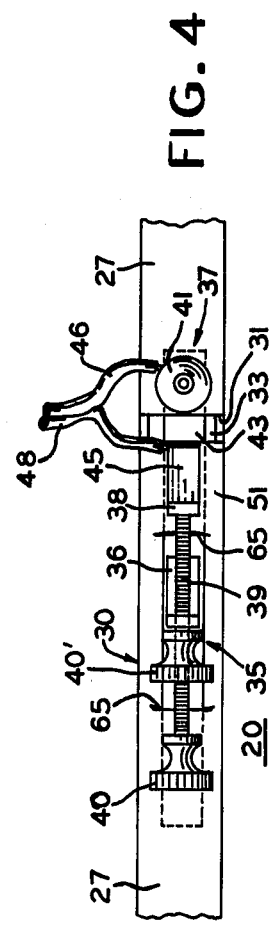
FIG. 4 is a top view of the make-break contact assembly switch means showing the electrical make contact state thereof with the strap means in its expanded position.

An alternative construction for the base strap 27 is shown in FIG. 4 wherein the shortened material overlay 55 is omitted and a pair of suitable slits or openings as at 65 are made generally centrally through the thickness dimension of the top material layer 51. The contactor blade 43 is generally flexible and is then threaded through the spaced openings 65 to permit a central length section to be exposed above the top material layer 51. The adjustable contact member 36 is thereupon fixedly attached in electrical contact continuity to this exposed central length section of the contactor blade 43. The expandible layer 33 of elastic material lies directly beneath the contactor blade 43, and would serve to insulate the contactor blade 43 from contact with the student 22 during installed expanded use of the corrective jaw position indicator 20. Further, the rivet 41 could be constructed to provide electrical contact continuity between the associated lead wire 46 and the contactor blade 43, but the shank and the lower portion thereof as shown in FIG. 5, could be desirably constructed of non-conductive materials to prevent any possible electrical contact with the student 22 during installed use of the corrective jaw position indicator 20.

The stationary contact member 36 is provided with a threaded opening (not shown) extending through an upwardly directed leg portion of the contact member 36. An elongated threaded pin or rod member 39 is insertedly engaged within such threaded opening, and is quite obviously adjustable in its degree of insertion therethrough. The rotatable pin 39 is provided with a first head element 40 which will readily facilitate finger tip rotational adjustment of the pin 39. A second tubular head element 40' is provided along the length dimension of the pin 39 to be rotatably adjusted to abut the upwardly turned leg portion of the stationary contact member 36 in order to arrest further adjustment of the pin 39 as through insertion or withdrawal thereof with respect to the contact member 36. Such a provision is thought to be well understood in the pertinent art of fastener devices and is readily understood from a consideration of the accompanying drawings.

It is convenient to provide adjustment for the pin 39 for resetting the break-make gap of the contact assembly means 35 in compensation for varying circumferential headsizes of students 22 and for varying the degree of sensitivity in positional movements of the jaw 28. In its understood operation, the base strap 27 is caused to expand along the sever 31 with forward positional movement of the jaw 28 of the student-user 22 whereupon the stationary contact member 36, through its physical interconnection with the rivet 41, is caused to remain generally at rest while the moveable contact member 38 is brought forwardly with the top material layer 51 until the moveable contact member 38 engages the pin 39 as best shown in FIGS. 3-5.

It is to be understood that it has been convenient to provide an explanation herein of the make contact operation of the contact assembly means 35 by assigning the expanding movement of the base strap 27 solely to the left-most portion of the indicator 20 as pictured in the accompanying drawings, but in actuality the make contact movement is probably contributable as well as some rearward movement of the right-most portion of the indicator 20. Generally, the forward jaw movement does tend to place the directed force against the frontal chin area of the base strap 27 which tends to provide forward movement of the left-most portion of the base strap 27 with reference to the location of the strap sever 31, and to then provide a more stable reference against noticeable movement of the right-most portion of the base strap 27 with respect to the location of strap sever 31.

In the preferred use of the corrective jaw position indicator 20, the base strap means 27 is secured about the head 21 of the student 22 as by conventional fastener means (not shown) so as to pass adjacent to the chin area 24 out of interference with the mouth 25 of the student and to pass along the length of the lower jaw 28 in order to be responsive to lower jaw positional movements. The contact assembly means 35 is mounted on the base strap means 27 to be disposed laterally along the side of the lower jaw 28, and with the head element 40 of the rotatable pin 39 projected forwardly of the contact assembly means 35 in order to permit ready access thereto for rotational adjustment of the pin 39 to reset the make-break gap and adjust the sensitivity of the indicator 20. The adjustment of the sensitivity is thus made easy for the student 22 to accomplish without interrupting the playing-learning relationship or having to remove the indicator 20 for any such sensitivity adjustments.

FIG. 2 shows the contact assembly means 35 in an open (break) contact position in which the circumference of the base strap means 27 is at its smallest dimension, wherein the base strap means 27 is not yet separated at the location of sever 31. FIGS. 3-5 best show the contact assembly means 35 in a closed (make) contact position in which the circumference of the base strap means 27 is at a larger expanded dimension wherein protruding jaw 28 movement of the student 22 has now caused the base strap means 27 to separate at the location of the sever 31. The elastic strap layer 33 serves to retain connection between the separated strap means 27, while allowing the base strap means 27 to expand at a controlled point more conductive to causing reciprocal movement of the slide contact member 38. The forward movement of the lower jaw 28 of the student 22 is demonstrated by dashed lines in FIG. 1 as a more forwardly protruded chin 24'.

The corrective jaw position indicator 20 further includes battery-powered alarm means 70, FIG. 7, to be enclosed within box-like receptacle housing means 75, FIG. 6. FIG. 7 shows a simplified electrical schematic circuit diagram of the alarm means 70, the various electrical elements of which are conveniently housed in the receptacle 75. The alarm means 70 is powered by a DC power source such as a battery as indicated by +V connection 71, and includes a relay 76 having a relay coil 77 and a set of contacts 78 and 79. The relay coil 77 is connected in electrical parallel across the contact assembly means 35 so as to be powered by the DC power source with the contact assembly 35 in the open position as shown in FIG. 2.

The relay 76 is then energized and the relay contact arm 81 is connected with the contact 79 to energize a first light coil 83 which defines a first visual indicator means. The visual indicator 83 is selected to be a red-colored light, and to be visible to the student-player 22 through a light emitting lens cover 85 disposed on the top cover of the receptacle 75. With the contact assembly 35 in the closed position as shown in FIGS. 3-5 and as indicated by dashed line position of the switch S1 of FIG. 7, the relay coil 77 is shorted and the relay 76 becomes de-energized whereupon the relay contact arm 81 is released to provide electrical connection with the contact 78, as shown by the dashed line position of the contact arm 81. This circuit configuration of the alarm means 70 causes the energization of a second light coil 87 which defines a second visual indicator means. The visual indicator 87 is selected to be a green-colored light, and to be visible to the student-player 22 through a light emitting lens cover 89 disposed on the top cover of the receptacle 75. An on-off toggle switch 91 having a two-position toggle post 93 is interconnected in the +V line by which to activate-deactivate the alarm means 70. The on-off positions of the two-position post 93 are shown in solid and dashed lines, respectively, in FIG. 6, and is similarly illustrated in the electrical diagram at 52. If desired, audible alarm means can be provided through the electrical series connection of a coil 92 therefor, as shown in dashed lines for series connection with the red light coil 83.

The intended use of the corrective jaw position indicator 20 provides that the student 22 will place the strapped contact assembly switch means 30 about his head substantially as shown in FIG. 1. The receptacle 75 will be desirably placed in full view of the student 22 in a non-interferring relationship with the wind musical instrument (not shown) to be played. The on-off toggle switch 91 is activated to energize the relay coil 77, and the red light is lit to demonstrate to the student 22 that the mouth-playing position is incorrect. The student forwardly aligns the lower jaw 28 to attain proper mouth-playing position which closes the contact assembly 38 to short the relay coil 77. The green light is then lit to indicate to the student 22 that the mouth-playing orientation with respect to the mouth-piece of the instrument is correct, and is to be maintained throughout the playing period. If the student unconsciously resumes an improper mouth-playing position during the playing period, the contact assembly 35 breaks contact and the relay coil 77 is again energized and the red light is immediately made visible to the student 22.

It is to be understood that while the present invention has been shown and described with reference to a preferred embodiment thereof, the invention is not limited to the precise form set forth herein, and that various modifications and changes may be made therein, and it is intended to cover in the appended claims such modifications and changes as fall within and not depart from the true spirit and scope of the invention.

What is claimed is:

1. A corrective jaw position indicator for proper playing of wind-type musical instruments to be worn encircling the head of a musician traversely of the chin area, comprising in combination expandible base strap means having a contracted circumferential position and an expanded circumferential position with respect to the contracted position, said base strap means being responsive to forward jaw movements to move to the expanded circumferential position, adjustable electrical contact means connected to the base strap means and including rotatable threaded pin means movable along the base strap means for adjusting contact position with respect thereto, slide electrical contact means connected to the base strap means and being moved with expanded movement of the base strap means toward the threaded pin means of the adjustable contact means for making electrical contact therewith, said threaded pin means being adjustable to provide predetermined spacing with respect to the slide contact means for adjusting for differences in head circumferences and degree of jaw movements, and alarm means for indicating the disconnect of electrical contact between the adjustable contact means and the slide contact means upon contracted movement of the strap means.

* * * * *